United States Patent [19]
Cunningham et al.

(10) Patent No.: US 7,505,030 B2
(45) Date of Patent: Mar. 17, 2009

(54) MEDICAL DEVICE AND PROCEDURE SIMULATION

(75) Inventors: Richard L. Cunningham, Washington, DC (US); Robert Cohen, Kensington, MD (US)

(73) Assignee: Immersion Medical, Inc., Gaithersburg, MD (US)

( * ) Notice: Subject to any disclaimer, the term of this patent is extended or adjusted under 35 U.S.C. 154(b) by 858 days.

(21) Appl. No.: 10/803,080

(22) Filed: Mar. 18, 2004

(65) Prior Publication Data

US 2005/0223327 A1   Oct. 6, 2005

(51) Int. Cl.
  *G09G 5/00* (2006.01)
(52) U.S. Cl. ............................ 345/156; 434/262
(58) Field of Classification Search ........... 345/156; 600/587; 715/701; 703/7; 606/1
  See application file for complete search history.

(56) References Cited

U.S. PATENT DOCUMENTS

| | | |
|---|---|---|
| 2,972,140 A | 2/1961 | Hirsch |
| 3,157,853 A | 11/1964 | Hirsch |
| 3,220,121 A | 11/1965 | Cutler |
| 3,226,846 A | 1/1966 | Wood |
| 3,497,668 A | 2/1970 | Hirsch |
| 3,517,446 A | 6/1970 | Corlyon et al. |
| 3,623,064 A | 11/1971 | Kagan |
| 3,902,687 A | 9/1975 | Hightower |
| 3,903,614 A | 9/1975 | Diamond et al. |
| 3,911,416 A | 10/1975 | Feder |
| 4,127,752 A | 11/1978 | Lowthorp |
| 4,160,508 A | 7/1979 | Frosch et al. |
| 4,236,325 A | 12/1980 | Hall et al. |
| 4,262,549 A | 4/1981 | Schwellenbach |
| 4,333,070 A | 6/1982 | Barnes |
| 4,439,162 A | 3/1984 | Blaine |
| 4,464,117 A | 8/1984 | Foerst |

(Continued)

FOREIGN PATENT DOCUMENTS

DE     102 58 952      8/2004

(Continued)

OTHER PUBLICATIONS

Baigrie, "Electric Control Loading—A Low Cost, High Performance Alternative," *Proceedings of Interservice/Industry Training Systems Conference*, pp. 247-254, Nov. 6-8, 1990.

(Continued)

*Primary Examiner*—Amr Awad
*Assistant Examiner*—Yong Sim
(74) *Attorney, Agent, or Firm*—Nixon Peabody LLP (57) ABSTRACT

A device is disclosed that includes an interface member including a material and a manipulandum movable in a degree of freedom. The manipulandum is able to penetrate the material. A sensor is configured to output a position signal based on the position of the manipulandum. An actuator is configured to output haptic feedback by applying a compressive force to the material based on the position signal. In other embodiments, a method is disclosed that includes receiving a position signal associated with a position of a manipulandum, where at least a portion of the manipulandum penetrates the interface material. Haptic feedback is output by varying a density of the interface material based on the position signal.

26 Claims, 6 Drawing Sheets

U.S. PATENT DOCUMENTS

| | | |
|---|---|---|
| 4,484,191 A | 11/1984 | Vavra |
| 4,513,235 A | 4/1985 | Acklam et al. |
| 4,581,491 A | 4/1986 | Boothroyd |
| 4,599,070 A | 7/1986 | Hladky et al. |
| 4,708,656 A | 11/1987 | De Vries et al. |
| 4,713,007 A | 12/1987 | Alban |
| 4,750,487 A | 6/1988 | Zanetti |
| 4,789,340 A | 12/1988 | Zikria |
| 4,794,392 A | 12/1988 | Selinko |
| 4,885,565 A | 12/1989 | Embach |
| 4,891,764 A | 1/1990 | McIntosh |
| 4,907,973 A | 3/1990 | Hon |
| 4,930,770 A | 6/1990 | Baker |
| 4,934,694 A | 6/1990 | McIntosh |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin |
| 5,038,089 A | 8/1991 | Szakaly |
| 5,078,152 A | 1/1992 | Bond |
| 5,113,872 A | 5/1992 | Jahrmarkt et al. |
| 5,149,270 A | 9/1992 | McKeown |
| 5,165,897 A | 11/1992 | Johnson |
| 5,175,459 A | 12/1992 | Danial et al. |
| 5,186,695 A | 2/1993 | Mangseth et al. |
| 5,212,473 A | 5/1993 | Louis |
| 5,217,003 A | 6/1993 | Wilk |
| 5,240,417 A | 8/1993 | Smithson et al. |
| 5,271,290 A | 12/1993 | Fischer |
| 5,275,174 A | 1/1994 | Cook |
| 5,283,970 A | 2/1994 | Aigner |
| 5,290,276 A | 3/1994 | Sewell, Jr. |
| 5,295,694 A | 3/1994 | Levin |
| 5,299,810 A | 4/1994 | Pierce |
| 5,309,140 A | 5/1994 | Everett |
| 5,334,027 A | 8/1994 | Wherlock |
| 5,403,191 A | 4/1995 | Tuason |
| 5,417,210 A | 5/1995 | Funda et al. |
| 5,436,622 A | 7/1995 | Gutman et al. |
| 5,437,607 A | 8/1995 | Taylor |
| 5,466,213 A | 11/1995 | Hogan |
| 5,480,307 A | 1/1996 | Lang et al. |
| 5,518,406 A | 5/1996 | Waters |
| 5,547,382 A | 8/1996 | Yamasaki |
| 5,575,761 A | 11/1996 | Hajianpour |
| 5,609,485 A | 3/1997 | Bergman et al. |
| 5,623,582 A | 4/1997 | Rosenberg |
| 5,629,594 A | 5/1997 | Jacobus et al. |
| 5,667,517 A | 9/1997 | Hooven |
| 5,682,886 A * | 11/1997 | Delp et al. .................. 600/407 |
| 5,690,582 A | 11/1997 | Ulrich et al. |
| 5,691,898 A | 11/1997 | Rosenberg et al. |
| 5,701,140 A | 12/1997 | Rosenberg et al. |
| 5,704,791 A | 1/1998 | Gillio |
| 5,720,742 A | 2/1998 | Zacharias |
| 5,766,016 A | 6/1998 | Sinclair et al. |
| 5,767,839 A | 6/1998 | Rosenberg |
| 5,769,640 A | 6/1998 | Jacobus et al. |
| 5,785,630 A | 7/1998 | Bobick et al. |
| 5,800,179 A | 9/1998 | Bailey |
| 5,821,920 A | 10/1998 | Rosenberg et al. |
| 5,828,197 A | 10/1998 | Martin et al. |
| 5,873,732 A | 2/1999 | Hasson |
| 5,967,790 A | 10/1999 | Strover et al. |
| 6,036,495 A | 3/2000 | Marcus et al. |
| 6,037,927 A | 3/2000 | Rosenberg |
| 6,038,488 A | 3/2000 | Barnes et al. |
| 6,057,828 A | 5/2000 | Rosenberg et al. |
| 6,106,301 A | 8/2000 | Merril |
| 6,111,577 A | 8/2000 | Zilles et al. |
| 6,113,395 A | 9/2000 | Hon |
| 6,126,450 A | 10/2000 | Mukai et al. |
| 6,160,489 A | 12/2000 | Perry et al. |
| 6,193,653 B1 | 2/2001 | Evans et al. |
| 6,318,146 B1 * | 11/2001 | Madsen et al. ................ 73/1.86 |
| 6,375,471 B1 | 4/2002 | Wendlandt et al. |
| 6,377,011 B1 | 4/2002 | Ben-Ur |
| 6,422,941 B1 | 7/2002 | Thorner et al. |
| 6,437,771 B1 | 8/2002 | Rosenberg et al. |
| 6,921,267 B2 * | 7/2005 | van Oostrom et al. ........ 434/272 |
| 6,965,370 B2 | 11/2005 | Gregorio et al. |
| 7,056,123 B2 | 6/2006 | Gregorio et al. |
| 7,091,950 B2 | 8/2006 | Rosenberg et al. |
| 2001/0016804 A1 | 8/2001 | Cunningham et al. |
| 2003/0006892 A1 | 1/2003 | Church |
| 2003/0036714 A1 | 2/2003 | Kuth |
| 2003/0076298 A1 | 4/2003 | Rosenberg |
| 2003/0130674 A1 | 7/2003 | Kasahara et al. |
| 2004/0009459 A1 * | 1/2004 | Anderson et al. ........... 434/262 |
| 2004/0106916 A1 | 6/2004 | Quaid et al. |

FOREIGN PATENT DOCUMENTS

| | | |
|---|---|---|
| EP | 0349086 | 1/1990 |
| JP | H2-185278 | 7/1990 |
| JP | H4-8381 | 1/1992 |
| JP | H5-192449 | 8/1993 |
| JP | H7-24147 | 1/1995 |
| SU | 1124372 | 11/1984 |
| WO | WO 91/06935 | 5/1991 |
| WO | WO 95/20787 | 8/1995 |
| WO | WO 96/28800 | 9/1996 |
| WO | WO 96/39944 | 12/1996 |
| WO | WO 01/78039 | 10/2001 |
| WO | WO 02/094080 | 11/2002 |

OTHER PUBLICATIONS

Iwata, "Pen-based Haptic Virtual Environment," 0-7803-1363-1/93 IEEE, pp. 287-292, 1993.

Russo, "The Design and Implementation of a Three Degree of Freedom Force Output Joystick," MIT Libraries Archives, pp. 1-131, May 1990, archived Aug. 14, 1990.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Jones et al., "A perceptual analysis of stiffness," ISSN 0014-4819 Springer International (Springer-Vertag); *Experimental Brain Research*, vol. 79, No. 1, pp. 150-156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25-44, May 2, 1993.

Snow et al., "Model-X Force-Reflecting-Hand-Controller," NT Control No. NPO-17851; JPL Case No. 7348, pp. 1-4, with 45 pages of attachments, Jun. 15, 1989.

Ouh-Young, "Force Display in Molecular Docking," Doctoral Dissertation, University of North Carolina at Chapel Hill, UMI Order No. 9034744, pp. 1-369, 1990.

Tadros, Control System Design for a Three Degree of Freedom Virtual Environment Simulator Using Motor/Brake Pair Actuators, *MIT Archive*, pp. 1-88, Feb. 1990, archived Aug. 13, 1990.

Caldwell et al., "Enhanced Tactile Feedback (Tele-Taction) Using a Multi-Functional Sensory System," 1050-4729/93, pp. 955-960, 1993.

Adelstein, "Design and Implementation of a Force Reflecting Manipulandum for Manual Control research," DSC-vol. 42, *Advances in Robotics*, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC-vol. 42, *Advances in Robotics*, pp. 55-61, ASME 1992.

Russo, "Controlling Dissipative Magnetic Particle Brakes in Force Reflective Devices," DSC-vol 42, *Advances in Robotics*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," *Cooperative Intelligent Robotics in Space*, Rui J. deFigueiredo et al., Editor, Proc. SPIE vol. 1387, pp. 215-222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man-Machine Interface for Advanced Teleoperation," Science, vol. 208, No. 4450, pp. 1327-1335, 1980.

Bejczy et al., "Generalization of Bilateral Force-Reflecting Control of Manipulators," *Proceedings Of Fourth CISM-IFToMM*, Sep. 8-12, 1981.

McAffee, "Teleoperator Subsystem/Telerobot Demonsdtrator: Force Reflecting Hand Controller Equipment Manual," *JPL D-5172*, Jan. 1988.

Minsky, "Computational Haptics: The Sandpaper System for Synthesizing Texture for a Force-Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21-23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference*, University of New Hampshire, Mar. 10-11, 1988.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf-blind individuals," *IEEE Virtual Reality Annual International Symposium*, Seattle, WA, Sep. 18-22, 1993.

Rabinowitz et al., "Multidimensional tactile displays: Identification of vibratory intensity, frequency, and contactor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy et al., "A Laboratory Breadboard System For Dual-Arm Teleoperation," *SOAR '89 Workshop*, JSC, Houston, TX, Jul. 25-27, 1989.

Ouh-Young, "A Low-Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejczy, et al., "Universal Computer Control System (UCCS) For Space Telerobots," CH2413-3/87/0000/0318501.00 1987 IEEE, 1987.

Patrick, "Design, Construction, and Testing of a Fingertip Tactile Display for Interaction with Virtual and Remote Environments," *Master of Science Thesis*, MIT, Aug. 1990, archived Nov. 8, 1990.

Calder, "Design of A Force-Feedback Touch-Introducing Actuator For Teleoperator Robot Control," *Bachelor of Science Thesis*, MIT, May 1983, archived Jun. 23, 1983.

Wiker, "Teletouch Display Development: Phase 1 Report," *Technical Report 1230*, Naval Ocean Systems Center, San Diego, Jul. 1988.

Bliss, "Optical-to-Tactile Image Conversion for the Blind," *IEEE Transactions on Man-Machine Systems*, vol. MMS-11, No. 1, Mar. 1970.

Johnson, "Shape-Memory Alloy Tactile Feedback Actuator," *Armstrong Aerospace Medical Research Laboratory*, AAMRL-TR-90-039, Aug. 1990.

Kontarinis et al., "Tactile Display of Vibratory Information in Teleoperation and Virtual Environments," PRESENCE. 4(4):387-402, Harvard Univ., 1995.

Aukstakalnis et al., "Silicon Mirage: The Art and Science of Virtual Reality," ISBN 0-938151-82-7, pp. 129-180, 1992.

Eberhardt et al., "Inducing Dynamic Haptic Perception by The Hand: System Description and Some Results," DSC-vol. 55-1, *Dynamic Systems and Control*: vol. 1, ASME 1994.

Gobel et al., "Tactile Feedback Applied to Computer Mice," *International Journal of Human-Computer Interaction*, vol. 7, No. 1, pp. 1-24, 1995.

Pimentel et al., "Virtual Reality: through the new looking glass," 2$^{nd}$ Edition; McGraw-Hill, ISBN 0-07-050167-X, pp. 41-202, 1994.

"Cyberman Technical Specification," *Logitech Cyberman SWIFT Supplement to Logitech Mouse Technical Reference and Programming Guide*, Apr. 5, 1994.

Ouhyoung et al., "The Development of A Low-Cost Force Feedback Joystick and Its Use in the Virtual Reality Environment," *Proceedings of the Third Pacific Conference on Computer Graphics and Applications, Pacific Graphics '95*, Seoul, Korea, Aug. 21-24, 1995.

Kaczmarek et al., "Tactile Displays," *Virtual Environment Technologies*, Chap. 9, pp. 349-414.

Lake, "Cyberman from Logitech," at http://www.ibibilo.org/GameBytes/issue21/greviews/cyberman.html, 1994.

"Component Maintenance Manual With Illustrated Parts List, Coaxial Control Shaker Part No. C-25502," Safe Flight Instrument Corporation, Revised Jan. 28, 2002 (3 pages).

"Technical Manual Overhaul Instructions With Parts Breakdown, Coaxial Control Shaker Part No. C-25502," Safe Flight Instrument Corporation, Revised Jul. 15, 1980 (23 pages).

Scannell, "Taking a Joystick Ride," *Computer Currents*, Boston Edition, vol. 9, No. 11, Nov. 1994.

Yamakita et al., "Tele-Virtual Reality of Dynamic Mechanical Model," *Proceedings of the 1992 IEEE/RSJ International Conference on Intelligent Robots and Systems*, Raleigh, NC, Jul. 7-10, 1992.

Noll, "Man-Machine Tactile," *SID Journal*, Jul./Aug. 1972 Issue.

Rosenberg, "Virtual Fixtures: Perceptual Overlays Enhance Operator Performance in Telepresence Tasks," *Ph.D. Dissertation*, Stanford University, Jun. 1994.

Sawbones Worldwide website page, http://www.sawbones.com, dated Oct. 17, 2003.

"Biomechanical Test Materials", Sawbones Worldwide, website: http://www.sawbones.com/products/bio/, dated Oct. 17, 2003.

"SEXTANT™ Percutaneous Rod Insertion—Overview", Article 1573, Spineuniverse.com, website: http://www.spineuniverse.com/displayarticle.php/article_1573.html, dated Jan. 21, 2004.

"SEXTANT™ Percutaneous Rod Insertion—Overview", Article 1574, Spineuniverse.com, website: http://www.spineuniverse.com/displayarticle.php/article1574.html, dated Jan. 21, 2004.

"SEXTANT™ Percutaneous Rod Insertion—Pedicle Screws", Article 1575, Spineuniverse.com, website: http://www.spineuniverse.com/displayarticle.php/article1575.html, dated Jan. 21, 2004.

"CD HORIZON® SEXTANT™ Rod Insertion Set", Medtronic Sofamor Danek, website: http://www.medtronisofamordanek.com/patient-minimal-sextant.html, dated Jan. 21, 2004.

"SEXTANT™ Percutaneous Rod Insertion—Features", Article 1576, Spineuniverse.com, website: http://www.spineuniverse.com/displayarticle.php/article1576.html, dated Jan. 21, 2004.

"SEXTANT™ Percutaneous Rod Insertion—Surgical Techniques", Article 1577, Spineuniverse.com, website: http://www.spineuniverse.com/displayarticle.php/article1577.html, dated Jan. 21, 2004.

"SEXTANT™ Percutaneous Rod Insertion—Clinical Experience", Article 1578, Spineuniverse.com, website: http://www.spineuniverse.com/displayarticle.php/article1578.html, dated Jan. 21, 2004.

EnduraTEC, New Full Spine Simulator Provides Unique Benefits for Spinal Device Engineering, "The Challenge: To Provide a Versatile Tool for Realistic Simulation of Spinal Kinematics".

Bostrom, Mikeal et al., "Design of An Interactive Lumbar Puncture Simulator With Tactile Feedback," IEEE 0-7803-1363, 1993, pp. 280-286.

Chen, Elaine et al, "Force feedback for surgical simulation," Proceedings of the IEEE 86, No. 3, Mar. 1998, pp. 524-530.

Chen, Elaine Y. et al, "Exos Slip Display Research and Development," DSC-vol. 55-1, Dynamic Systems and Control, vol., 1994, pp. 265-270.

Cover, Steven A, et al., "Interactively Deformable Models for Surgery Simulation," IEEE Computer Graphics and Applications, vol. 13, No. 6, pp. 68-75, 1993.

Dawson Steven L. et al., "The Imperative for Medical Simulation," Proceedings of the IEEE, vol. 86, No. 3, Mar. 1998, pp. 479-483.

Delingette, Herve, "Toward Realistic Soft-Tissue Modeling in Medical Simulation," Proceedings of the IEEE, vol. 86, No. 3, Mar. 1998, pp. 512-523.

Jackon et al., "Force Feedback and Medical Simulation," Interactive Technology and the New Paradigm, Chapter 24, pp. 147-151.

Merril, Jonathan R. et al., "Virtual Reality for Trade Shows and Individual Physician Training," Medical Applications, 1994, pp. 40-44.

Tutorial "Models For Simulating Instrument-Tissue Interactions" at MMVR 2001 in Newport-Beach, California, Jan. 24-27, 2001, 40 pages.

Satava, Richard M., Current and Future Applications of Virtual Reality for Medicine, Proceedings of the IEEE, vol. 86, No. 3, Mar. 1998, pp. 484-489.

Shahidi et al., "Clinical Applications of Three-Dimensional Rendering of Medical Data Sets," Proceedings of the IEEE, vol. 86, No. 3, Mar. 1998, pp. 555-568.

Stone, Robert J. et al., "Virtual Environment Training Systems for Laparoscopic Surgery," The Journal of Medicine and Virtual Reality, 1995, pp. 42-51.

Wang, Yong-Jun, et al., "Force Feedback Assisted Nasoscope Virtual Surgery Simulator", 13 Journal of System Simulation, vol. 3, May 2001, pp. 404-407 (english abstract).

* cited by examiner

MEDICAL DEVICE AND PROCEDURE SIMULATION

BACKGROUND

The invention relates generally to medical procedure simulations, and more particularly to a method and apparatus for simulating a spinal stabilization procedure.

Minimally invasive medical procedures reduce danger to patients, decrease recovery time, and provide superior outcomes when compared to open surgery. The physician typically operates at a distance from the surgical site, however, frequently using remote cameras or other imaging modalities, and remotely controlled surgical tools. Consequently, these procedures can be difficult to master. Thus, the use of procedure simulation systems provides a learning environment in which the physician can gain needed skills without putting patients at risk.

A known minimally invasive spinal stabilization procedure uses four screws and two connecting rods to stabilize two adjacent vertebrae. The procedure makes six puncture incisions; one each for the four screws and the two connecting rods. After two screws are inserted in adjacent vertebrae, they are connected with a curved rod and the procedure is repeated with two more screws. The connecting rod is aligned with slots in two screws by means of a device that constrains the curved rod to move in an arc that is constrained to properly align the two screws, which are in turn each attached to two legs of the alignment device.

Known medical procedure simulators have been developed that simulate the functionality of open spinal procedures. In one example of such simulators, a user manipulates various devices in connection with simulated bone structure. The bone structure is simulated with castings fabricated from a material such as compressed sawdust. Minimally invasive procedures, however, use fluoroscopic guidance systems. A simulator using such technology would be expensive to produce and would needlessly expose the user to radiation. Additionally, using known physical model simulation techniques would not allow the simulation of certain features such as physical anatomical variations (e.g., varying bone densities), vital signs and other important aspects of the procedure.

Thus, a need exists for a medical procedure simulation device and method that can combine physical models with computer controlled feedback, simulated fluoroscopy, and simulated physical anatomical variations to enable the user to experience a more realistic training experience.

SUMMARY OF THE INVENTION

A device is disclosed that includes an interface member including a material and a manipulandum movable in a degree of freedom. The manipulandum is able to penetrate the material of the interface member. A sensor is configured to output a position signal based on the position of the manipulandum. An actuator is configured to output haptic feedback by applying a compressive force to the material based on the position signal.

In other embodiments, a method is disclosed that includes receiving a position signal associated with a position of a manipulandum, where at least a portion of the manipulandum penetrates the interface material. Haptic feedback is output by varying a density of the interface material based on the position signal.

DETAILED DESCRIPTION

Devices and methods for simulating medical procedures are described. More specifically, a particular medical device for minimally invasive spinal stabilization and an associated procedure is described and then a simulation device and method for this medical device and procedure is described. The Medtronic Sofamor Danek CD HORIZON® SEXTANT™ Percutaneous Rod Insertion Set 700, illustrated in FIG. 7, uses CD HORIZON® M8 cannulated titanium Multi-Axial Screws 750. Cannulated screws 750 are used to facilitate percutaneous navigation of the pedicles of a vertebrae with a guide wire (not shown). A series of tubular dilators 770 are used to create a tunnel through the soft-tissues of the back, prior to placement of the screws 750 over the guide wire. The cannulated screws 750 are comparable in strength, profile, and fatigue resistance to the CD Horizon M8 multi-axial screws that are well known to spine surgeons. The screws vary in length from 35 to 55 mm long.

Figure 7:
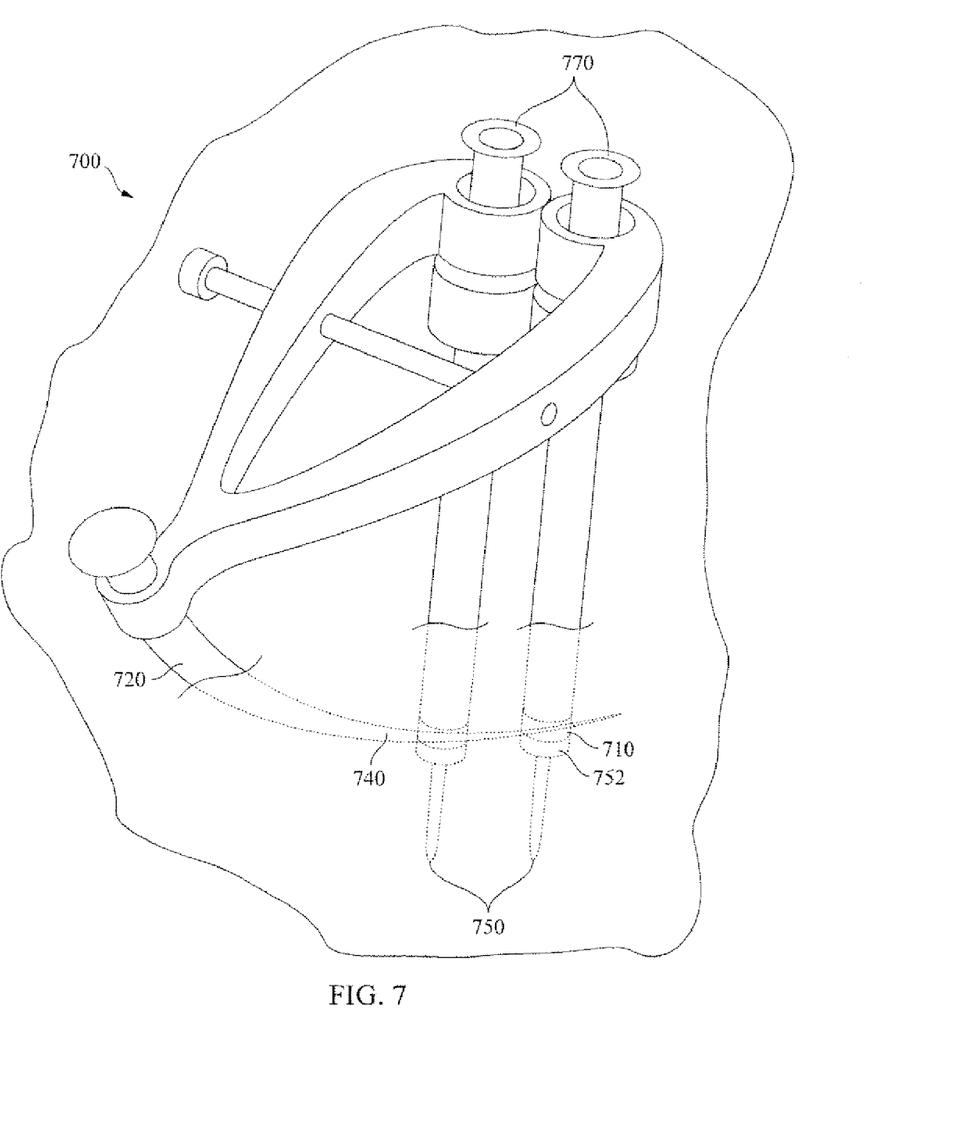
FIG. 7 is a perspective view of an example of a medical device that can be simulated by embodiments of the invention.

The rods 740 that are used to connect the pedicle screws are pre-cut and pre-bent in 5 mm increments for single level cases, and in 1 cm increments for bi-level cases. The pre-contoured rods range in size from 30 to 90 mm in length. The rods 740 are pre-contoured because the insertion technique depends upon a precise geometric arrangement of the screw heads 752 that are then matched to the radius of curvature of the rod 740.

Each cannulated screw 750 is fitted with a specially designed screw extender 710 that allows the multi-axial heads to be manipulated independently. This extender 710 also has an integrated mechanism (not shown) for holding, engaging, and securing the setscrew (not shown) that fixes the rod 740 to the screw head 752.

After the pedicle screws 750 have been inserted into the proper vertebral bodies (not shown) and their positions have been confirmed radiographically, the heads 752 of the pedicle screws 750 are connected to each other with rod 740. The screw heads 752 can be percutaneously manipulated with the screw extenders 710, and smooth rod insertion is made possible by connecting the two screw extenders 710 together, which assures that the multi-axial screw heads 752 are aligned along the same curvilinear path as the pre-contoured rod 740. The geometry of the screw extenders 710 and rod introducer 720 dictates that the rod 740 follows a precise path, through the soft tissues and into properly aligned screw heads 752.

Proper torque on the setscrews (not shown) that secure the rod 740 to the pedicle screws 750 is assured with a "break-off" mechanism that snaps off the screw head when the proper torque has been reached. After the pedicle screw 750 and rod 740 construct has been assembled and confirmed with the fluoroscope, the setscrews are secured and torqued with the "break-off" mechanism. The device 700 can be simulated using embodiments of the invention as described below.

Figure 1:
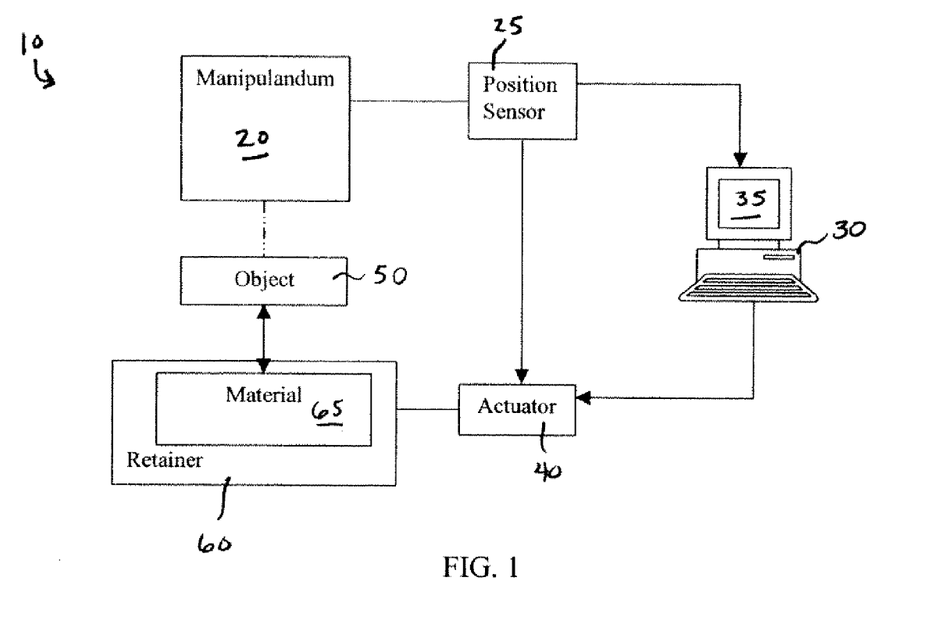
FIG. 1 is a schematic representation of a medical procedure simulation device according to an embodiment of the invention.

FIG. 1 is a schematic representation of a medical procedure simulation device 10 according to an embodiment of the invention. The device 10 includes a manipulandum 20 that is coupled to a position sensor 25 and is movable in at least two degrees of freedom. The position sensor 25 is configured to output signals to an actuator 40 based on the position of the manipulandum 20. An object 50 is removably or fixedly coupled to the manipulandum 20. The actuator 40 is coupled to a retainer 60. The retainer 60 houses an interface member 65 including a material that is configured to receive the object 50. The actuator 40 is configured to engage the retainer 60 in such a manner as to modify the density of the material of interface member 65 based on the position of the manipulandum 20 and/or the object 50, as will be described below.

In some embodiments of the invention, the medical procedure simulation device 10 includes a processor 30 that is configured to receive signals from the position sensor 25, and output signals to the actuator 40 and to a display 35 that is configured to output images associated with the medical procedure simulation as described below.

The display 35 is coupled to the processor 30 and is configured to output a simulated image based on data values associated with a position of the manipulandum 20 relative to, for example, the interface member 65. The processor 30 can be, for example, a commercially available personal computer, or a less complex computing or processing device that is dedicated to performing one or more specific tasks. For example, the processor 30 can be a terminal dedicated to providing an interactive virtual reality environment.

The processor 30, according to one or more embodiments of the invention, can be a commercially available microprocessor. Alternatively, the processor 30 can be an application-specific integrated circuit (ASIC) or a combination of ASICs, which are designed to achieve one or more specific functions, or enable one or more specific devices or applications. In yet another embodiment, the processor 30 can be an analog or digital circuit, or a combination of multiple circuits.

The processor 30 includes a memory component (not shown in FIG. 1). The memory component can include one or more types of memory. For example, the memory component can include a read only memory (ROM) component and a random access memory (RAM) component. The memory component can also include other types of memory that are suitable for storing data in a form retrievable by the processor 30. For example, electronically programmable read only memory (EPROM), erasable electronically programmable read only memory (EEPROM), flash memory, as well as other suitable forms of memory can be included within the memory component. The processor 30 can also include a variety of other components, such as for example, co-processors, graphics processors, etc., depending upon the desired functionality of the medical procedure simulation device 10.

The processor 30 is in communication with the memory component, and can store data in the memory component or retrieve data previously stored in the memory component. The components of the processor 30 can communicate with devices external to the processor 30 by way of an input/output (I/O) component (not shown in FIG. 1). According to one or more embodiments of the invention, the I/O component can include a variety of suitable communication interfaces. For example, the I/O component can include, for example, wired connections, such as standard serial ports, parallel ports, universal serial bus (USB) ports, S-video ports, local area network (LAN) ports, small computer system interface (SCSI) ports, and so forth. Additionally, the I/O component can include, for example, wireless connections, such as infrared ports, optical ports, Bluetooth® wireless ports, wireless LAN ports, or the like.

The processor 30 is configured to receive signals from the position sensor 25 and output signals to the actuator 40. The processor 30 receives data values associated with the position (i.e., location and orientation) of the manipulandum 20 and, hence, the position and orientation of object 50 with respect to the interface member 65. The position signals can be absolute position signals or can be measured as a relative distance and direction from a predetermined reference point (e.g., the interface member 65, the retainer 60, or a support surface on which the device 10 is positioned). In alternative embodiments, a sensor or multiple sensors (not shown) can be disposed in the object 50, the interface member 65 or the retainer 60, and can be configured to determine the location of the manipulandum 20. Alternatively, the object 50, the interface member 65, or the retainer 60 can include a wireless or wired transmitter (not shown) that sends a position signal to the processor 30 to determine position information of the object 50 relative to the interface member 65. In some embodiments of the invention, the sensors can detect multiple degrees of freedom of the manipulandum (e.g., translation, pitch, yaw, rotation, etc.)

As the manipulandum 20 is moved from one position to another, the images output on the display 35 are updated based on the position signal. It is desirable for the position of the object 50 relative to the interface member 65 to be coordinated in a realistic sense with respect to the images output on the display 35. For example, when the material of the interface member 65 is a simulated pedicle of a vertebrae and the object 50 is a screw or a simulated screw, the images output on the display 35 should correspond accordingly. Images viewed on the display are obtained from actual spinal stabilization procedures and are reproduced based on position signals received from the position sensor 25. For example, in a spinal stabilization simulation, where the screws have been properly inserted, the image displayed can show a properly simulated screw.

The medical procedure simulation device 10 is configured to output haptic feedback based on the position of the manipulandum 20. The haptic feedback is designed to replicate the sensation that would be experienced by a user, for example, during a spinal stabilization procedure as described above. More specifically, as the user screws the object 50 into the material of the interface member 65, haptic feedback is output based on the position and orientation of the object 50. The position and orientation of the object 50 is related to the position and orientation of the manipulandum 20 by virtue of its coupling to the manipulandum 20. The manipulandum 20 can be rotated about an axis defined along the length of the manipulandum 20 and translate along that same axis while rotating. Depending upon the type of manipulandum 20 that is used, the manipulandum 20 can translate along the axis while a part or all of the manipulandum 20 does not rotate.

Figure 2:
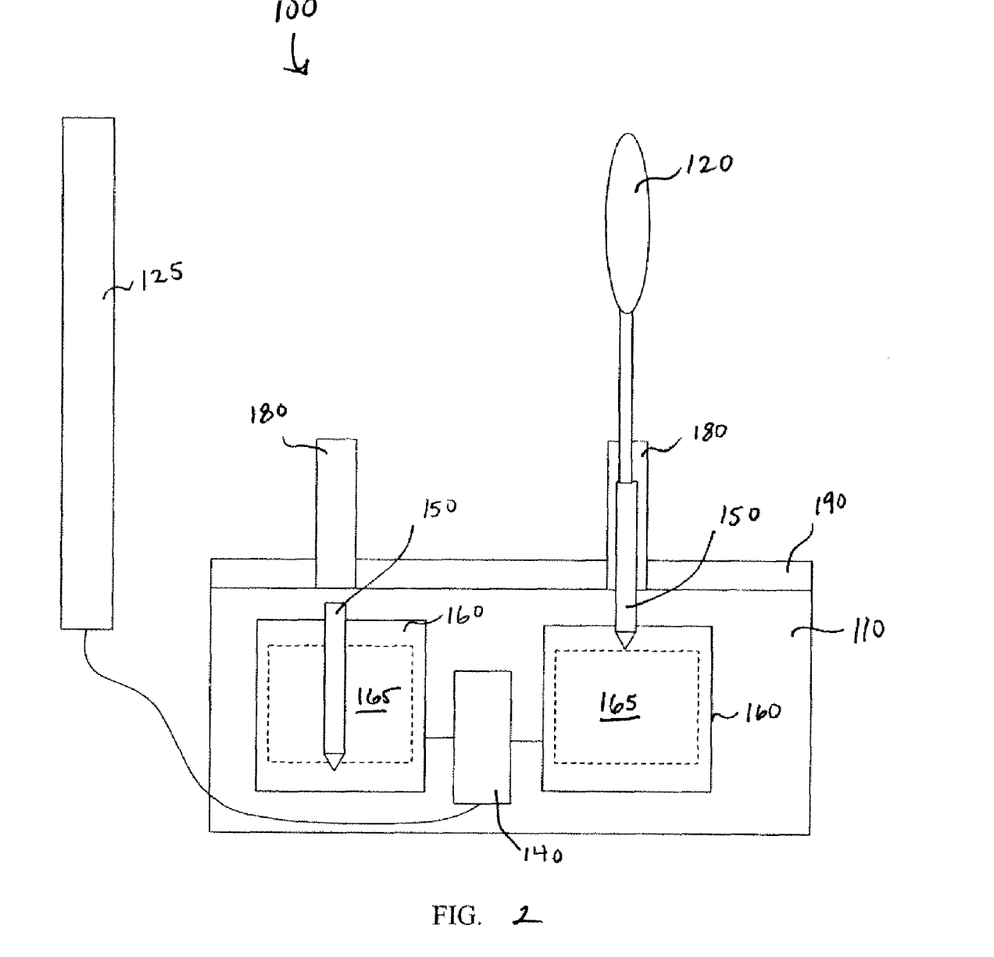
FIG. 2 is a block diagram of a device according to an embodiment of the invention.

Referring to FIG. 2, a block diagram of a medical procedure simulation device according to an embodiment of the invention is illustrated. The medical procedure simulation device 100 includes a housing 110 covered with a simulated skin 190. The housing 110 can be, for example, a mannequin formed as a human body. The simulated skin 190 is configured to provide the sensation of skin penetration when inserting various elements of the device 100 as described below. The simulated skin 190 is a self-healing material in that the simulated skin is penetrable, but is able to return substantially to its original form once the inserted elements of the device 100 are removed.

The housing 110 defines an opening that is configured to receive at least one interface member 165 that includes a material configured to simulate a bone structure, such as a vertebrae. The material of the interface member 165 is configured to receive an actual or simulated pedicle screw 150. The material is maintained in an interior portion of a retainer 160. In embodiments of the medical procedure simulation device 100, the interface member 165 material is fabricated from, for example, compressed sawdust such as that available from Sawbones® Worldwide in Vashon, Wash. Alternatively, the material can be fabricated from Selective Laser Sintering (SLS). SLS is a process by which three-dimensional parts are created by the fusing or sintering of powdered thermoplastic materials with the heat from an infrared laser beam. In this manner, various materials, such as compressed nylon, can be used. The material can be discarded after a single use, or may be used numerous times depending upon the durability of the material.

A screwdriver 120 is used to drive the screw 150 to penetrate the material of the interface member 165. While being manipulated, the screws 150 are firmly attached to screwdriver 120. The screwdriver 120 and the screw 150 are guided into the housing 110 through a shaft 180. The shaft 180 can be fixed in the housing 110 or can be removably coupled such that the user of the device is able to simulate proper insertion of the shaft 180 as part of the simulated procedure.

A sensor 125 is configured to output a position signal based on the position of the screwdriver 120. Because of the connection between the screwdriver 120 and the screw 150, the location and orientation of the screw 150 can be determined based on the position signal associated with the position of the screwdriver 120 and/or the position and orientation of the shaft 180. The sensor 125 can incorporate any known methods appropriate for tracking the position of the screwdriver 120. For example, the sensor may be a visual sensor configured to track marks on the screwdriver 120 or an extension (not shown) coupled to the screwdriver 120. Alternatively, a mechanical arm (not shown) can be coupled at one end to the screwdriver 120 and at another end to the position sensor 125. A mechanical arm such as the one used in the Microscribe® device available from Immersion Corporation in San Jose, Calif. is suitable for some embodiments of the invention. An example of such a mechanical arm is disclosed in U.S. patent application Ser. No. 09/687,923, now U.S. Pat. No. 6,697,748, which is incorporated herein by reference.

The position sensor 125 is coupled to an actuator 140 and is configured to output position signals. Actuation signals based on the position signals are then sent to the actuator 140. Alternatively, if the actuator 140 has an embedded processor, the position signals are sent directly to the actuator 140. The actuator 140 is coupled to the retainer(s) 160 and is configured to output haptic feedback based on the position signal by applying a compressive force to the material of the interface member 165.

The medical simulation device 100 can be used, for example, to train users to orient the screws 150 to align properly with the pedicles of a vertebrae. In an actual procedure, as the screw is successfully embedded in the vertebrae, the screw encounters varying density bone that is visible on a fluoroscope display and is perceptible to the user's sense of touch. The medical procedure simulation device 100 simulates the sensation of encountering varying bone density by varying the density of the material of the interface member 165.

Figures 3, 4:
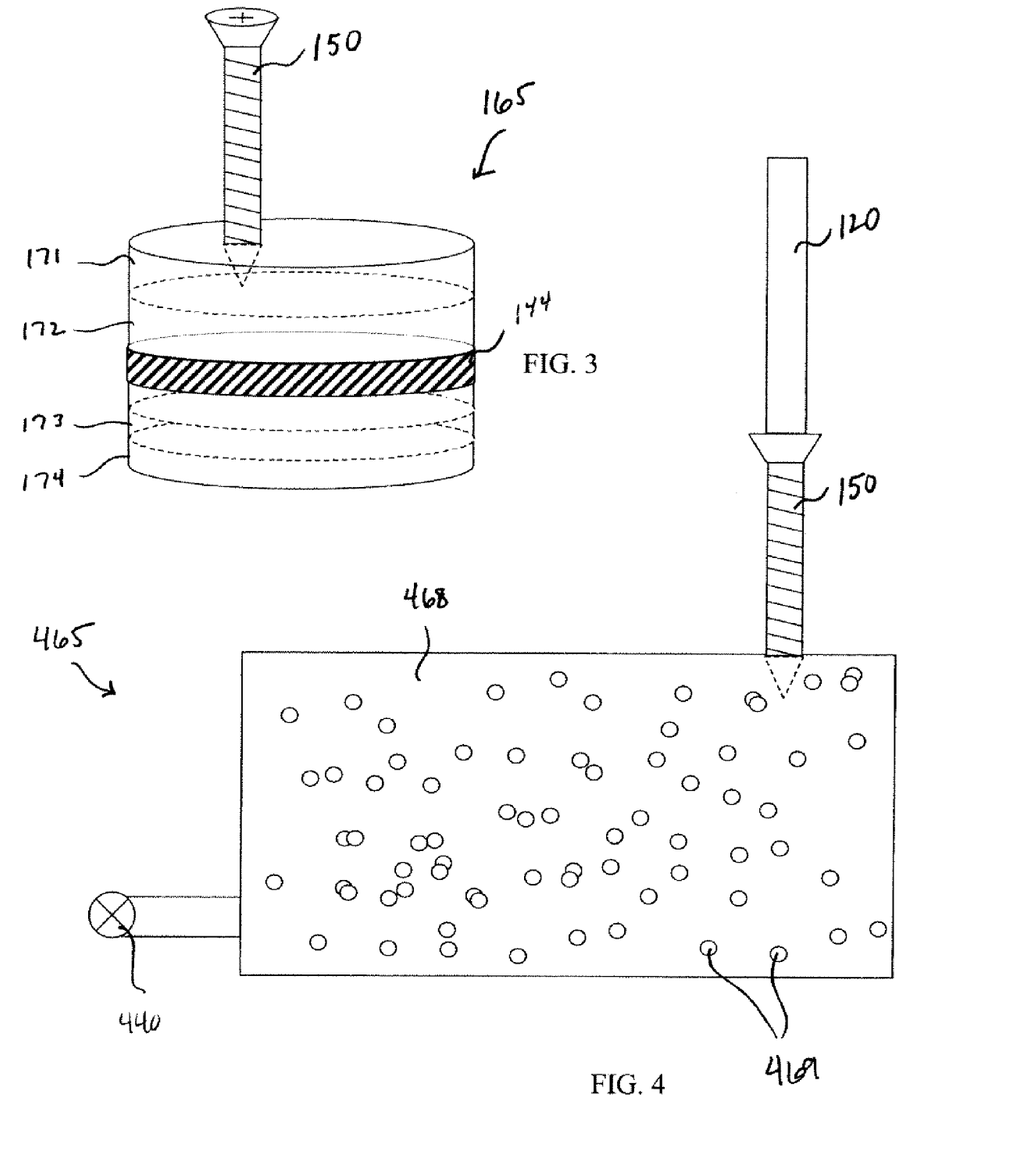
FIG. 3 is a perspective view of an interface member for use with the device illustrated in FIG. 2.
FIG. 4 is a plan view of an interface member for use with the device according to an alternative embodiment of the invention under a first set of conditions.

Referring to FIG. 3, an example of an interface member 165 is illustrated in which the material includes multiple layers 171, 172, 173 and 174. The density of the material in layers 171, 172, 173 and 174 may be the same or different. As illustrated in FIGS. 2 and 3, the screw 150 is configured to penetrate the layers 171, 172, 173 and 174 of interface member 165. To further vary the density of the material of the interface member 165, the actuator 140 includes a clamp or band 144 that encircles the interface member 165. As discussed above, the actuator 140 is configured to vary the density of the material based on the position signal received from the position sensor 125. Although the clamp or band 144 is shown in FIG. 3 as surrounding layer 172 only, in other embodiments the claim or band 144 can surround more or all layers of the material of the interface member 165.

In use, as the screw 150 is manipulated and penetrates the material of the interface member 165, the diameter of the clamp 144, and likewise the opening defined by the clamp 144, can vary. The diameter of the clamp 144 may be varied by actuation of a motor (not shown) coupled to the clamp 144. With the varying diameter of the clamp 144, the compressive force applied to the material of the interface member 165 varies as well. Accordingly, haptic feedback is provided, thereby providing the sensation of a variable density bone structure.

The density of the material of interface member 165 can be varied to simulate various conditions. For example, if the screw 150 is not properly inserted (e.g., inserted at an improper angle) the clamp 140 will quickly loosen to simulate shearing of the bone structure. Alternatively, if the screw 150 is properly inserted, the clamp 140 will compress the material to simulate dense bone structure until the screw 150 moves an appropriate distance, at which point the clamp will release to simulate entry of the screw 150 into the less dense portion of the bone structure.

Figure 6:
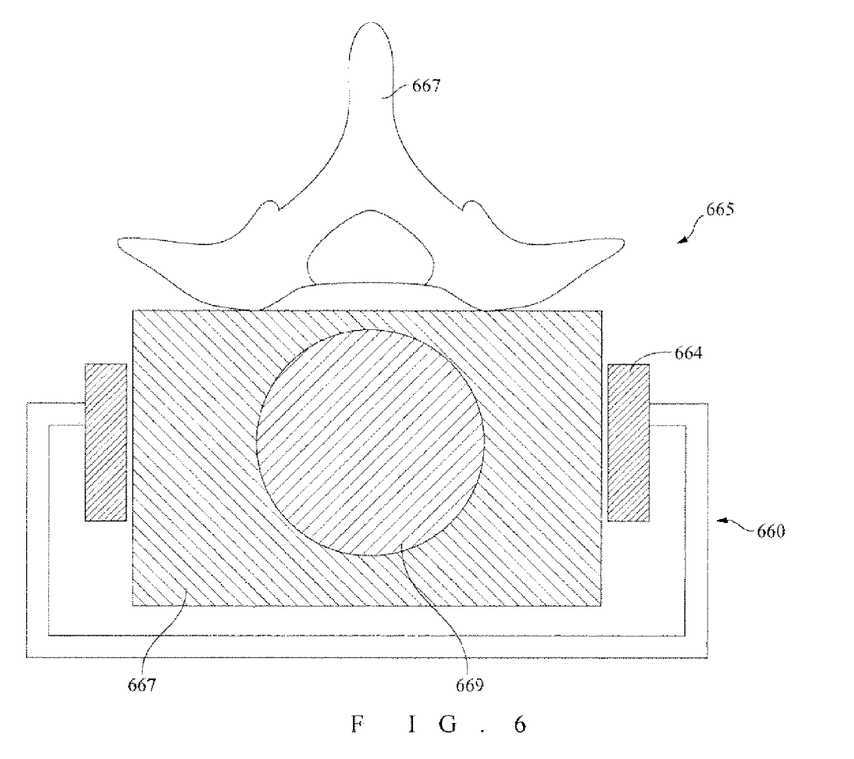
FIG. 6 is a cross-sectional view of a device according to another embodiment of the invention.

An alternative embodiment of an interface member for use with the medical simulation device 100 is illustrated in FIG. 6. The interface member 665 includes a structural member 667 that simulates various elements of the spine that could be encountered when performing various medical procedures. The material of the interface member 665 can be fabricated from varying density material. For example, a first portion 667 of the material can be fabricated using a material having a density and a second portion 669 of the material can have a density different from the density of the first portion 667. In the illustrated embodiment, the actuator 644 includes a band that is coupled to the retainer 660. Alternatively, the band is integrally formed as part of the retainer 660. The density of the first portion 667 of the material and the second portion 669 of the material can be further varied by actuation of the band based on the position signal received by the actuator 644 as described above.

Figure 5:
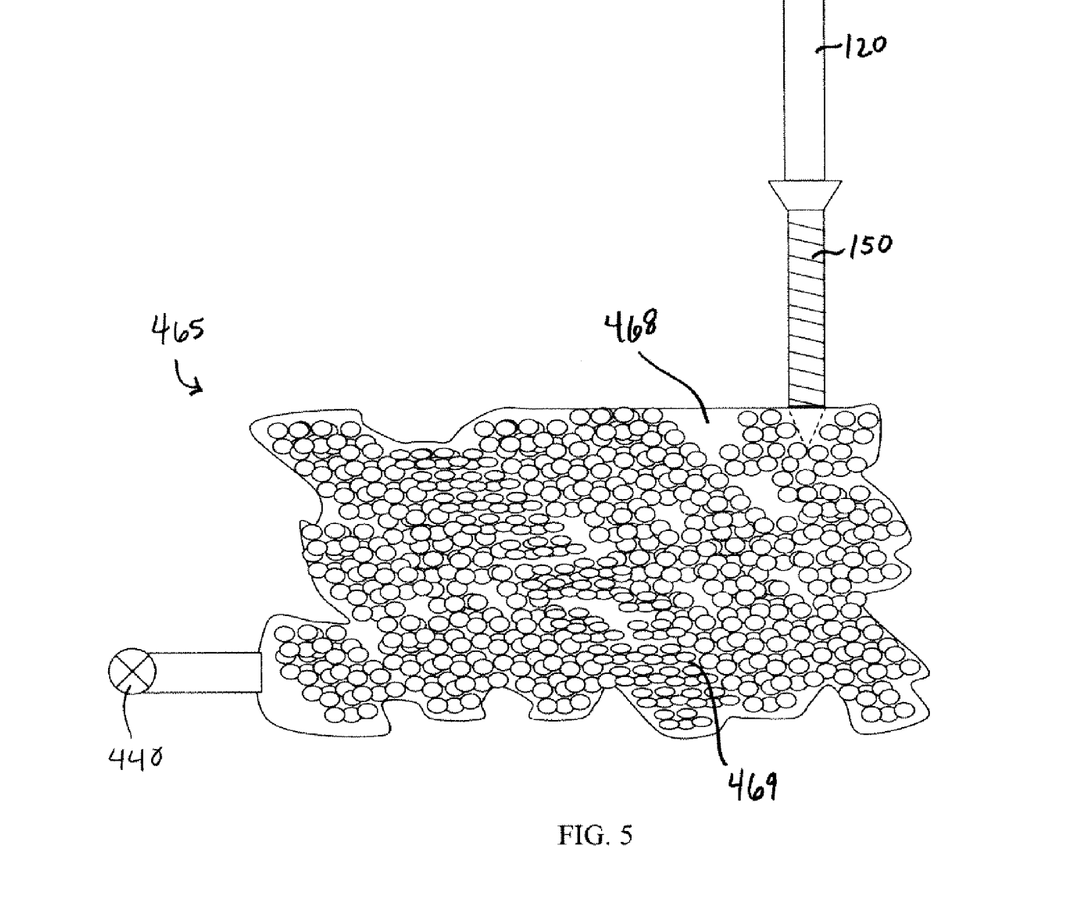
FIG. 5 is a plan view of the interface member illustrated in FIG. 3 under a second set of conditions.

An alternative embodiment of an interface member for use with the medical simulation device 100 is illustrated in FIGS. 4 and 5. FIG. 4 illustrates interface member 465 in a decompressed condition and FIG. 5 illustrates interface member 465 in a compressed condition. In the illustrated embodiment, the interface member 465 defines a chamber 468 including compressible beads 469 that can be compressed and decompressed to simulate various conditions based on the position of the screwdriver 120. The beads 469 can be fabricated from, for example, polystyrene, nylon (polyamide) powder, sugar, etc. FIGS. 4 and 5 are for illustrative purposes only and a greater bead density than that shown would be required to pressurize the interface member 465 to a degree sufficient to simulate bone density.

As illustrated, the density of the beads in the interface member 465 can be modified via vacuum pump 440. When the area inside the chamber 468 is evacuated, the external air pressure causes the beads to compress. The chamber 468 contains a sufficient amount of compressible beads to pressurize the interface member 465. As discussed above, as the screw 150 penetrates the interface member, the density can be varied to output haptic feedback based on the position of the screwdriver 120. The chamber 468 has a seal sufficient to prevent air from leaking into or escaping from the chamber 468 at the entry point of the screw 150.

The density of the beads 469 can be varied by modifying the size of the chamber 468. In such an embodiment, this chamber 468 is defined by a flexible housing that collapses around the beads 469 to increase the density. Likewise, the flexible housing can be expanded to decrease the density.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalence.

The previous description of the embodiments is provided to enable any person skilled in the art to make or use the invention. While the invention has been particularly shown and described with reference to embodiments thereof, it will be understood by those skilled in art that various changes in form and details may be made therein without departing from the spirit and scope of the invention.

For example, although the manipulandum 20 is described as being a screwdriver 120 in some embodiments of the invention, in an alternative embodiment the manipulandum can be any tool that is configured to move the object into the material of the interface member. For example, the manipulandum can be a drill, a hammer, a pneumatic hammer, a pneumatic or hydraulic press, a pneumatic or hydraulic drill or screwdriver, etc.

Although the processor 30 is described above as being directly coupled to the manipulandum 20 and the actuator 40, in an alternative embodiment, the processor 30 can be coupled to the medical procedure simulation device 10 via a network.

Additionally, although the position sensor 125 is described above as being configured to output position signals based on the position of the screwdriver 120, in some alternative embodiments, the position sensor is configured to track the position of the screws 150 directly. In a further alternative embodiment, sensors embedded in the interface member 165 can replace or augment the position sensor 125.

Although the material of the interface member 165 is described above as being disposed in the retainer 160, in some alternative embodiments, the retainer 160 need not be used. In other words, the actuator 140 can be directly coupled to the material and apply a compressive force directly to the material.

Although the medical procedure simulation device 110 is not illustrated as including the various rods and external structures associated with the actual device illustrated in FIG. 7, the simulation device can include any or all of the elements associated with the actual device whether illustrated or not.

Although the manipulandum 20 and object 50 are disclosed as being separate elements, the manipulandum 20 and object 50 can be fixedly coupled as discussed above and thus considered a single element. In this manner, the manipulandum can penetrate the interface member when the object is considered a part of the manipulandum.

Although the clamp 144 is illustrated as a thin band that surrounds only a portion of the interface member 165, the clamp 144 may be wide enough to cover the entire length of the material of the interface member 165. Moreover, while only one actuator is illustrated, the medical procedure simulation device 100 may include more than one actuator. Each actuator may be associated with a different interface member, or multiple actuators may be arranged to selectively compress a single interface member.

Although the housing 110 is disclosed above as having an opening to receive the interface members 165, in some alternative embodiments, the interface members may be coupled directly to the simulated skin 190 and a housing 110 is not needed.

Although the interface member 465 is described as having beads 469 that are compressed by decreasing the volume of chamber 468, in alternative embodiments, the beads 469 can be pre-compressed by means of a band placed around chamber 468. For example, the beads 469 can be initially pressurized a predetermined amount and then either further pressurized by pressurizing the chamber as discussed above, or depressurized by expanding the chamber against the band placed around the chamber.

What is claimed is:

1. A device, comprising:
   an interface member including a material of selectively variable density, wherein the material includes a first layer having a first density and a second layer having a second density;
   a manipulandum movable in a degree of freedom, the manipulandum configured to penetrate the material;
   a sensor configured to output a position signal based on the position of the manipulandum; and
   an actuator configured to change the density of the material within at least a portion of the interface member in response to the position signal, the actuator configured to change the density of the second layer to be different from the density of the first layer as the manipulandum is moved between the first layer and the second layer, wherein the change in density imparts a haptic effect to the manipulandum.

2. The device of claim 1, wherein the material includes a plurality of compressible beads.

3. The device of claim 1, wherein the material includes a plurality of polystyrene beads.

4. The device of claim 1, wherein the interface member includes a simulated bone structure.

5. The device of claim 1, wherein the actuator is a clamp coupled to the interface member.

6. The device of claim 1, wherein the actuator is a vacuum coupled to the interface member.

7. The device of claim 1, the actuator being a first actuator, the device further comprising a plurality of actuators including the first actuator, each actuator from the plurality of actuators being an individually actuatable clamp.

8. A device, comprising:
   a manipulandum movable in a degree of freedom;
   a sensor configured to output a position signal based on a position of the manipulandum;

a retainer defining an interior in which a material is disposed, the material configured to receive an object moved by the manipulandum and having a selectively variable density, wherein the material includes a first layer having a first density and a second layer having a second density; and an actuator coupled to the retainer, the actuator configured to change the density of the material within at least a portion of the interior of the retainer in response to the position signal, the actuator configured to change the density of the second layer to be different from the density of the first layer as the manipulandum is moved between the first layer and the second layer, wherein the change in density of the material imparts a haptic effect to the manipulandum.

9. The device of claim 8, wherein the manipulandum includes a first portion and a second portion, the second portion configured to be removably coupled to the object.

10. The device of claim 8, wherein the manipulandum is configured to move in a rotary degree of freedom about an axis, and move simultaneously along the axis.

11. The device of claim 8, wherein the interface member includes a simulated pedicle of a vertebrae.

12. The device of claim 8, wherein the interface member includes a simulated bone structure.

13. The device of claim 8, wherein the retainer is configured to compress the material in response to actuation of the actuator.

14. The device of claim 8, wherein the retainer is configured to modify a density of the material based on the position signal.

15. The device of claim 8, wherein the retainer is a clamp having an opening, the actuator including a motor configured to modify a size of the opening based on the position signal.

16. The device of claim 8, wherein the manipulandum is a screwdriver and the object is a screw.

17. The device of claim 8, further comprising:

a guide configured to receive at least a portion of the manipulandum, the guide being removably coupled adjacent to the retainer.

18. The device of claim 8, wherein the manipulandum is movable in two degrees of freedom.

19. The device of claim 8, wherein the manipulandum is movable in a rotary degree of freedom and a linear degree of freedom.

20. A method, comprising:

receiving a position signal via a sensor, the position signal associated with a position of a manipulandum, at least a portion of the manipulandum penetrating a material within an interface member, the material having a selectively variable density wherein the material includes a first layer having a first density and a second layer having a second density; and adjusting the density of the second layer of the material to be different from the density of the first layer of the material within at least a portion of the interface member via an actuator coupled to the sensor, wherein the adjusting of the density imparts a haptic effect onto the manipulandum as the manipulandum is moved between the first layer and the second layer.

21. The method of claim 20, wherein the adjusting the density includes applying a compressive force to the interface material.

22. The method of claim 20, wherein the adjusting the density includes applying a vacuum to the interface material.

23. An interface member for use with a haptic feedback device including a manipulandum movable in a degree of freedom, the interface member configured to be penetrated by the manipulandum, the interface member comprising:

a material portion configured to be penetrated by at least a portion of a manipulandum, the material portion and having a selectively variable density, wherein the material includes a first layer having a first density and a second layer having a second density;

a sensor configured to measure a position of the manipulandum within the material portion and output a position signal associated with the measured position; and an actuator coupled to the retainer, the actuator configured to change the density of the material portion in response to the position signal, the actuator configured to change the density of the second layer to be different from the density of the first layer as the manipulandum is moved between the first layer and the second layer, wherein the change in density of the material imparts a haptic effect onto the manipulandum.

24. The interface member of claim 23, further comprising a simulated bone structure.

25. The interface member of claim 23, wherein the material portion includes a plurality of compressible beads.

26. The interface member of claim 23, wherein the material portion includes a plurality of polystyrene beads.

* * * * *